United States Patent [19]

Kawai et al.

[11] Patent Number: 5,078,318
[45] Date of Patent: Jan. 7, 1992

[54] HEAT PUMP HEATING APPARATUS

[75] Inventors: Nobuo Kawai; Kazuaki Kamiyama, both of Fujinomiya, Japan

[73] Assignee: Kabushiki Kaisha Toshiba, Kawasaki, Japan

[21] Appl. No.: 514,398

[22] Filed: Apr. 26, 1990

[30] Foreign Application Priority Data

Apr. 28, 1989 [JP] Japan .................. 1-110145

[51] Int. Cl.⁵ ............. G05D 23/00; F25D 17/00
[52] U.S. Cl. ............................. 237/2 B; 62/180; 62/229
[58] Field of Search ........... 62/229 X, 228.4, 180 X, 62/186; 237/2 B

[56] References Cited

U.S. PATENT DOCUMENTS 4,407,139 10/1983 Ide et al. .................... 62/215

FOREIGN PATENT DOCUMENTS

| 0146448 | 11/1979 | Japan | 62/180 |
| 57-67735 | 4/1982 | Japan . | |
| 0056032 | 3/1984 | Japan | 62/229 |
| 0024614 | 2/1986 | Japan | 62/229 |

Primary Examiner—William E. Wayner
Attorney, Agent, or Firm—Foley & Lardner

[57] ABSTRACT

In a heat pump heating apparatus of this invention, a compressor included in a refrigerating cycle is operated at a speed corresponding to a blowoff temperature so that the temperature of air blown off into a room through an indoor fan from a condenser becomes close to a set value when a room temperature is less than its set value. The indoor fan is operated depending upon a room temperature, i.e., is operated under the state of a relatively great airflow when the room temperature is far lower than its set value and is operated under the state of a relatively small airflow when the room temperature is closer to its set value.

8 Claims, 6 Drawing Sheets

HEAT PUMP HEATING APPARATUS

FIELD OF THE INVENTION

This invention relates to an air-conditioner, and more particularly, to a heat pump heating apparatus.

BACKGROUND OF THE INVENTION

In a power adjustable heat pump heating apparatus, when a set temperature in regard to room temperature is set by, e.g., a remote controller or the rotational speed of a compressor, i.e., heating power is controlled in dependency upon a deviation between a room temperature and a set temperature. In this case, at the time of a large temperature deviation, i.e., a so called heavy heating load, the compressor is driven at a higher rotational speed. In contrast, at the time of a small temperature deviation, i.e., a light heating load, the compressor is driven at a lesser rotational speed.

In the case where the operation of a heating apparatus is initiated under the circumstance where a room temperature is considerably less than a set temperature, the room temperature gradually rises towards the set temperature. As a difference therebetween gradually becomes smaller, the rotational speed of the compressor also lowers. As the rotational speed of the compressor decreases, the temperature of air blown off from the heating apparatus into the room lowers. For this reason, when the room temperature becomes close to the set temperature, persons in the room might feel an uncomfortable chill.

SUMMARY OF THE INVENTION

Accordingly, an object of this invention is to provide a heat pump heating apparatus constituted so as not to give discomfort to persons in a room due to the lowering of a blowoff temperature even in the case where a deviation between a room temperature and a set temperature is small.

To achieve this object, in accordance with this invention, there is proposed a heat pump heating apparatus comprising a refrigerating cycle constructed to include a compressor, a condenser, and an evaporator; an indoor fan for blowing off air heat-exchanged by the condenser into a room; first drive means for adjustably driving the compressor; second drive means for adjustably driving the indoor fan; first sensor means for sensing a room temperature, second sensor means for sensing the temperature of air blown by the indoor fan; first setting means for setting a room temperature; second setting means for setting the temperature of air blown off from the indoor fan; first control means wherein when a room temperature sensed by the first sensor means is less than a temperature set by the first setting means, the first control means is operative to control a speed of the compressor through the first drive means so that a deviation between a temperature sensed by the second sensor means and a temperature set by the second setting means is reduced; and second control means for controlling the speed of an indoor fan through the second drive means in dependency upon a deviation between a room temperature sensed by the first sensor means and the temperature set by the first setting means.

In accordance with this invention, during a heating operation, the compressor is controlled in dependency upon a deviation between a blowoff temperature from the indoor fan and its set value, and the indoor fan is controlled in dependency upon a deviation between a room temperature and its set value. Thus, even when the indoor temperature becomes close to its set temperature, relatively warm air is blown off. Accordingly, this results in no possibility that persons in a room feel chill or discomfort.

DETAILED DESCRIPTION OF PREFERRED EMBODIMENTS

Figure 1:
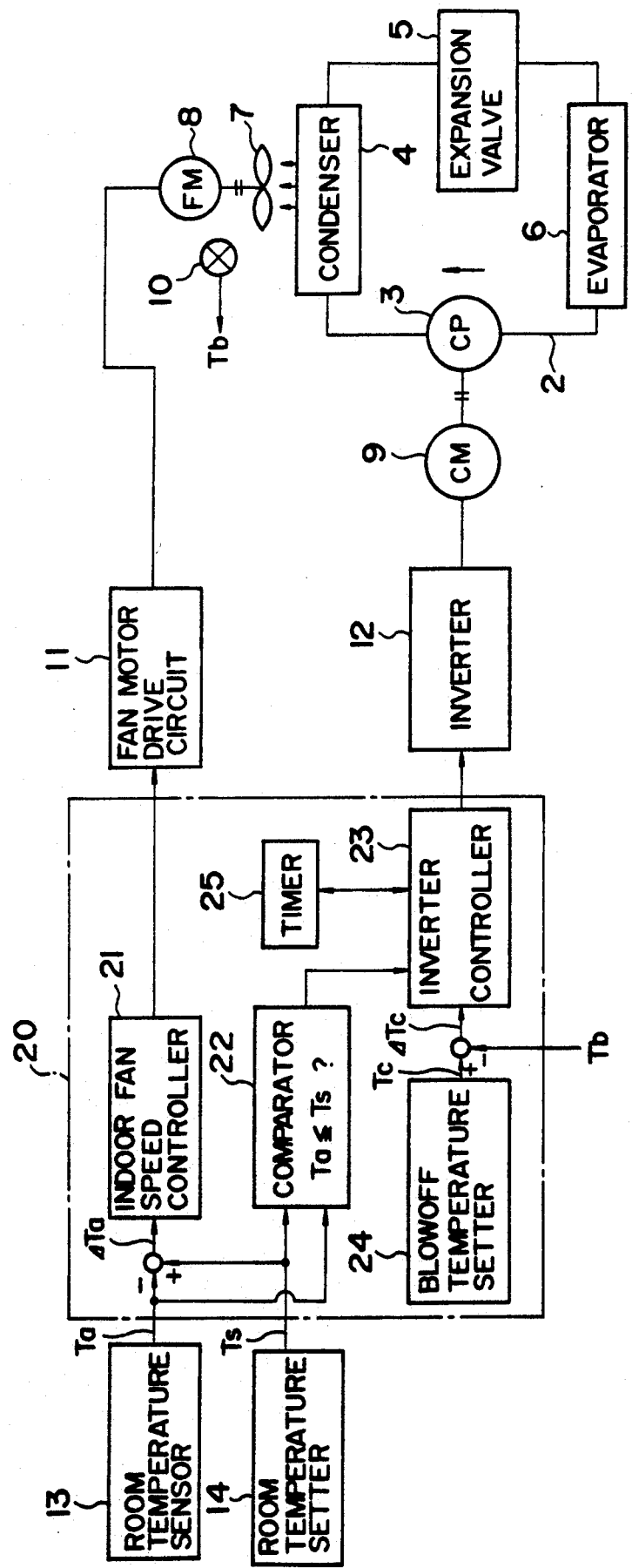
FIG. 1 is a block diagram showing the arrangement of a heat pump heating apparatus according to an embodiment of this invention.

FIG. 1 is a block diagram showing a heat pump heating apparatus in accordance with an embodiment of this invention. The heating apparatus in accordance with this embodiment is provided with a refrigerating cycle 2 constructed to include a compressor (CP) 3, a condenser 4, an expansion valve 5, and an evaporator 6. Air warmed by the condenser 4 is blown off into a room by an indoor fan 7. The fan 7 is driven by a fan motor 8. The compressor 3 is driven by a compressor motor 9. Temperature of air blown off from the condenser 4 through the fan 7 into the room, i.e., blowoff temperature Tb is sensed by a temperature sensor 10 arranged on a blowoff side of the fan 7. For the purpose of sensing the blowoff temperature, an output of a condenser temperature sensor attached on the condenser 4 may also be used. In such a case, the blowoff temperature is obtained by correcting the output of the condenser temperature sensor depending upon an airflow from the fan 7. The fan motor 8 is controlled by a control unit 20 through a fan motor drive circuit 11, and a compressor motor 9 is controlled by the control unit 20 through an inverter 12.

A room temperature Ta sensed by the room temperature sensor 13 and a set temperature Ts set by a room temperature setter 14 as well as the blowoff temperature Tb sensed by the temperature sensor 10 are inputted to the control unit 20. The fan 7 is subjected to speed control by an indoor fan speed controller 21 through the fan drive circuit 11 and the fan motor 8 so that airflow corresponding to a deviation between the set temperature Ts and the room temperature Ta, i.e., a temperature deviation $\Delta Ta$ $(=Ts-Ta)$ is provided. The drive circuit 11 is constituted by using, e.g., thyristors. On the other hand, the room temperature Ta and the set temperature Ts are compared with each other at a temperature comparator 22. When the relationship expressed as $Ta \leq Ts$ holds, the comparator 22 outputs an inverter ON signal. Responding to this inverter ON signal, an inverter controller 23 controls the output frequency and the output voltage of the inverter 12 so that the compressor motor 9 rotates at a speed corresponding to a deviation $\Delta Tc$ between a set temperature Tc set by a temperature setter 24 and a blowoff temperature Tb sensed by the temperature sensor 10. A timer 25 is provided in association with the inverter controller 23 for the purpose of conducting a control dependent upon time as described later. It is to be noted that respective elements within the controller 20 are realized by microcomputer software.

Figure 2:
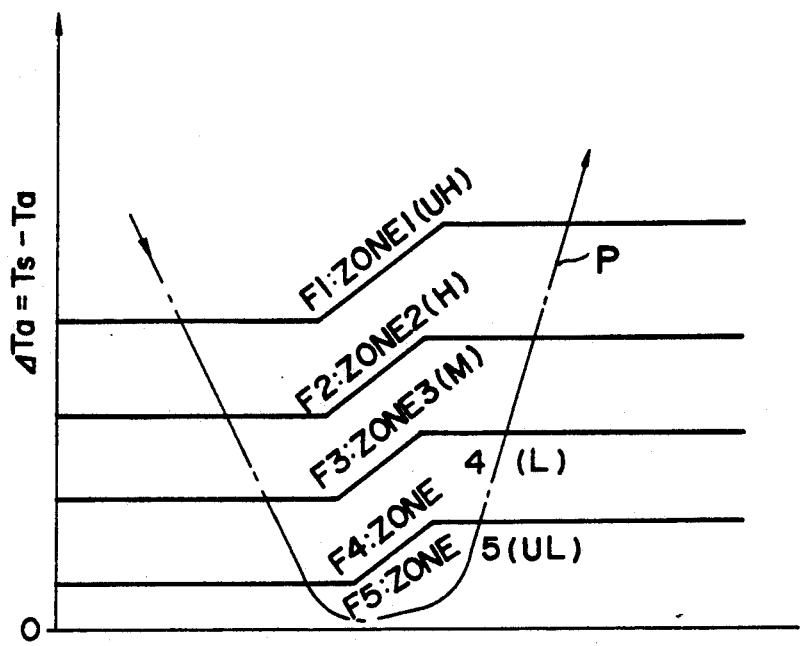
FIG. 2 is a diagrammatical view showing the manner of controlling an airflow of an indoor fan in a heat pump heating apparatus in accordance with an embodiment of this invention.

The setting of airflow of the fan 7 by the speed control unit 21 is made in accordance with the manner of control shown in FIG. 2. Namely, the airflow range is divided into five airflow zones F1, F2, F3, F4 and F5 in dependency upon a temperature deviation $\Delta Ta = Ts - Ta$. In the zone F1, a maximum air flow UH is set. In the zone F2, a greater airflow UH is set. In the zone F3, a medium airflow M is set. In the zone F4, a smaller airflow L is set. Furthermore, in the zone F5, a minimum airflow UL is set. It is to be noted that an airflow setting system in accordance with the hysteresis control for the prevention of hunting operation is shown in FIG. 2, and that a boundary value of the zone when the temperature deviation $\Delta Ta$ is in a decreasing process and a boundary value of the zone when the temperature deviation $\Delta Ta$ is in an increasing process are slightly different from each other as indicated by an arrow P. In this case, the boundary value of the zone when the deviation $\Delta Ta$ is in a decreasing process is relatively smaller than that when it is in an increasing process.

Figure 3:
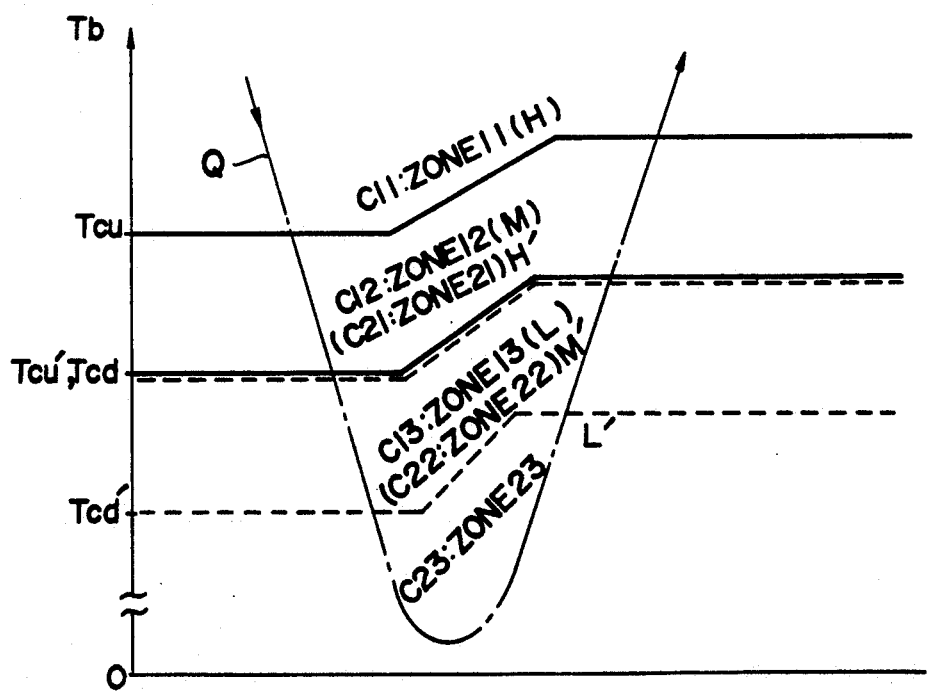
FIG. 3 is a diagrammatical view showing the manner of controlling a compressor speed in a heat pump heating apparatus in accordance with an embodiment of this invention.

The speed setting, i.e., power setting of the compressor 3 by the inverter controller 23 is conducted in accordance with the manner shown in FIG. 3. In FIG. 3, an upper limit set value Tcu and a lower limit set value Tcd of a blowoff temperature Tb at the time of an ordinary control, and an upper set value Tcu' and a lower limit set value Tcd' at the time of a shift-down control are set in dependency upon the blowoff temperature Tb. Thus, at the time of ordinary control, by respective set values, the set speed of the compressor 3 is partitioned into a high speed zone C11 (speed H), a medium speed zone C12 (speed M) and a low speed zone C13 (speed L). Similarly, at the time of a shift-down control, the set speed is partitioned into a high speed zone C21 (speed H'), a medium zone C22 (speed M'), and a low speed zone C23 (speed L') respectively shifted to the low speed side. Also in this case, in order to render a hysterestic characteristic with respect to the set value Tc of the blowoff temperature Tb, setting values in a temperature decreasing process and those in a temperature increasing process are slightly different from each other.

Figure 4A:
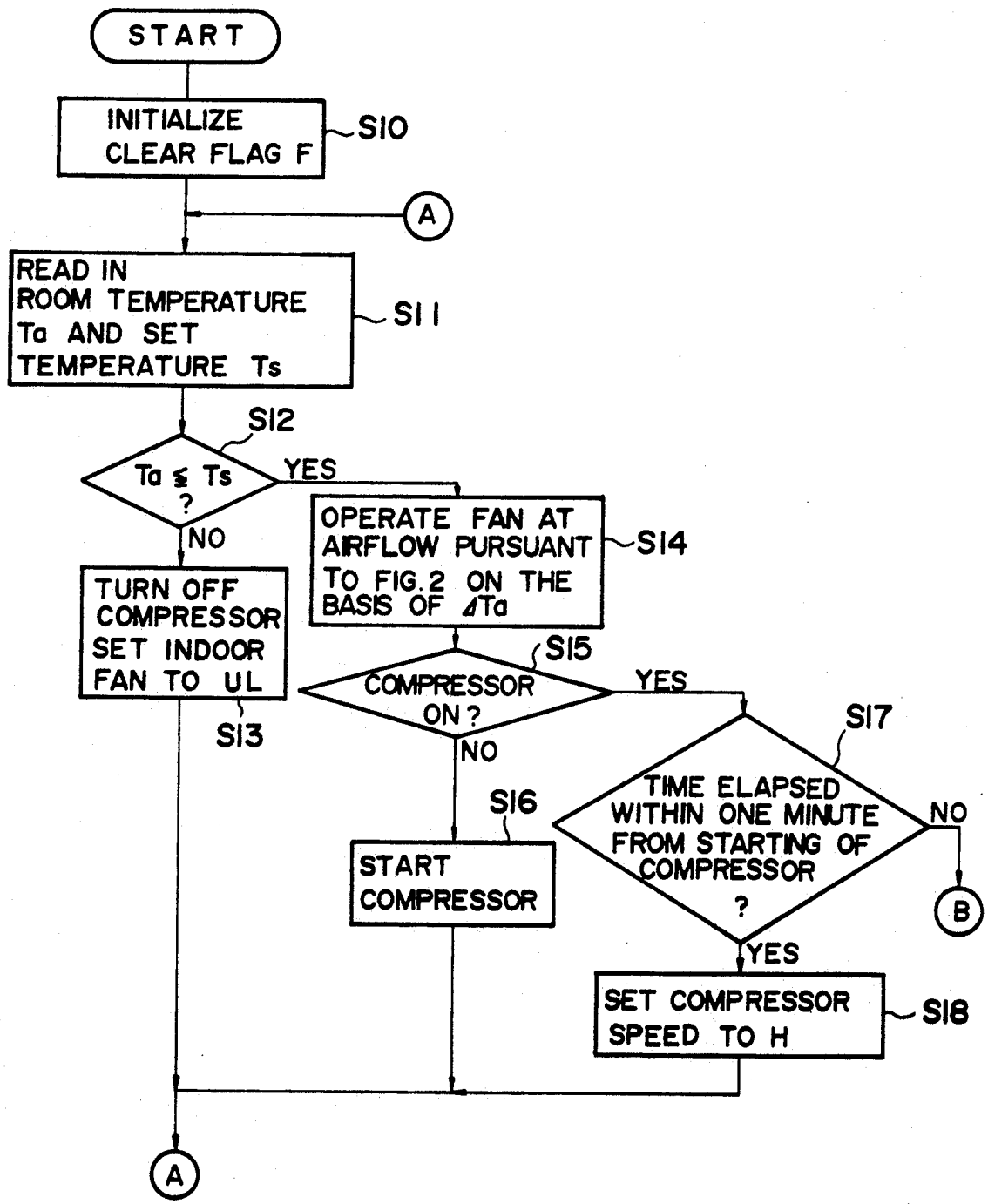
FIGS. 4A and 4B are flowcharts for explaining the control operation of the arrangement shown in FIG. 1, respectively.
Figure 4B:
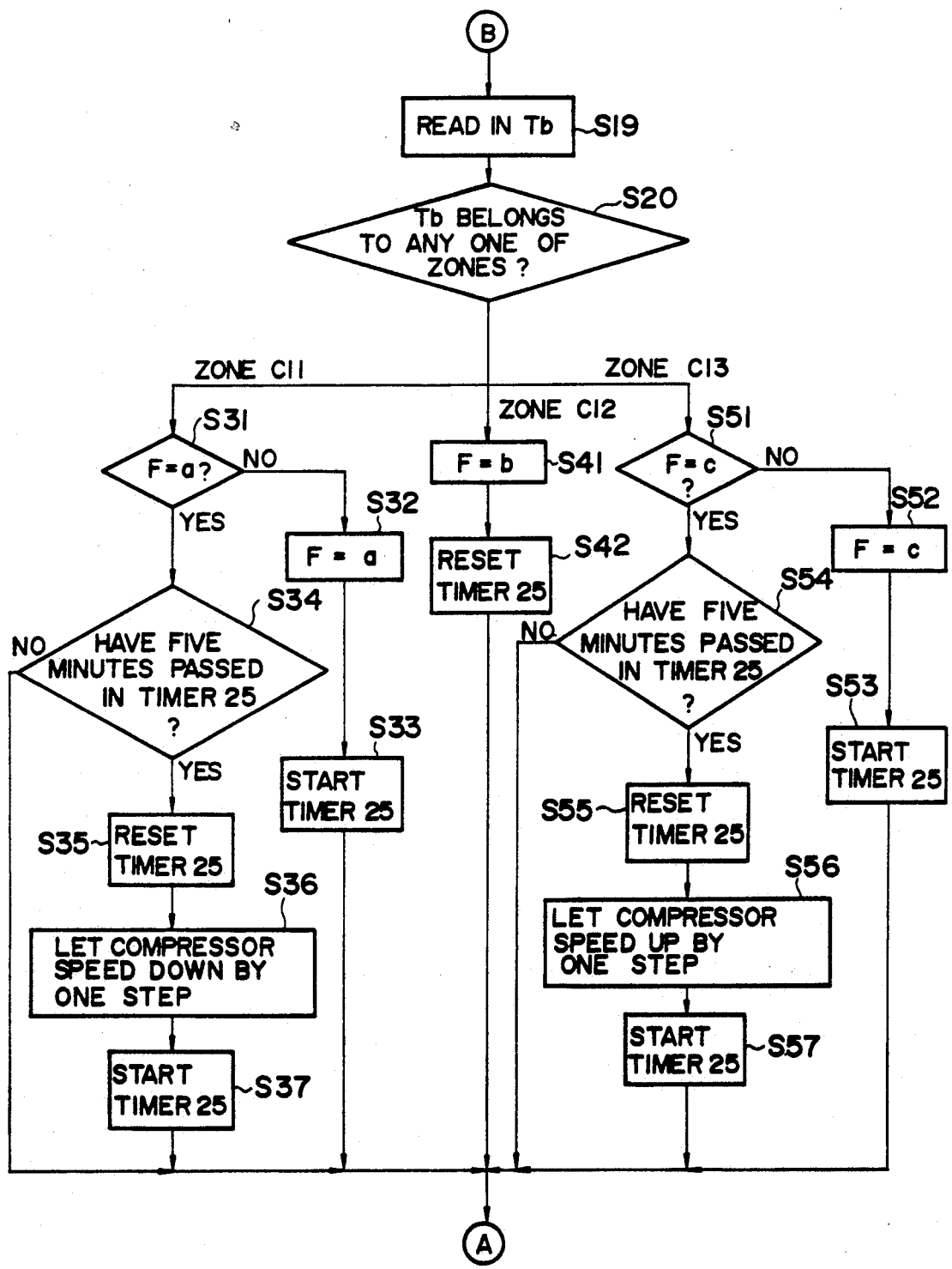

The control operation of the heating apparatus thus constructed will now be described with reference to the flowcharts shown in FIGS. 4A and 4B.

When the heating apparatus is powered, the control unit 20 initiates a control operation to first clear a flag F showing the relationship between a lapse of the operating time and the speed control mode of the compressor 3 (step S10). Then, the control unit 20 reads thereinto a room temperature Ta sensed by the sensor 13 and a set temperature Ts set by the room temperature setter 14 (step S11) to make a comparison between the temperatures Ta and Ts (step S12). When that temperature relationship is judged to not be $Ta \leq Ts$, i.e., to be $Ta > Ts$, since the room temperature Ta is above the set temperature Ts, it is unnecessary to blow off high temperature air into a room. Thus, there is no need to operate the compressor 3, i.e., the refrigerating cycle 2. The control unit 20 outputs a compressor OFF command signal to set the indoor fan 7 so that the airflow is equal to the minimum airflow UL to operate it (step S13).

On the other hand, at step S12, when it is judged that $Ta \leq Ts$ holds, the fan 7 is operated in accordance with a blowoff airflow set in correspondence with airflow sections shown in FIG. 2 on the basis of $Ta = Ts - Ta$ (step S14). The fan 7 is driven at a speed such that a set airflow is attained through the fan motor drive circuit 11 and the fan motor 8. Thereafter, whether or not the compressor 3 is in operation is checked (step S15). As a result, when the compressor 3 is judged to not be in operation, it is operated at a starting speed determined in advance (step S16). Thus, the operation returns to the step S11. The compressor 3 is operated by the inverter controller 23 through the inverter 12 and the compressor motor 9. In contrast, at the step S15, when the compressor 3 is judged to be in operation, whether or not the time elapsed from the starting of the compressor is within one minute is checked for the purpose of confirming whether or not the compressor 3 is in a starting process (step S17). As a result, when the elapsed time is judged to be within one minute, the speed of the compressor 3 is set to a high speed H (step S18). Thus, the operation returns to the step S11. At the step S17, when the time elapsed is judged to be above one minute, the compressor starting process is considered to be completed. Thus, the operation shifts to the step S19 (FIG. 4B).

At step S19, a blowoff temperature Tb is read in, and judgement as to whether that blowoff temperature Tb belongs to any one of three zones C11, C12 and C13 is made (step S20). The operation proceeds to the step S31, S41 or S51 in accordance with the judged zone.

At step S31, judgement as to whether F=a holds in connection with the flag F is made. As a result, when it is judged that F=a does not hold, the processing of F=a (step S32) is implemented to start the timer 24 (step S33) to return to the step S11. At the step S31, when it is judged that F=a holds, whether or not five minutes has passed from the start of the timer 24 is checked (step S34). As long as five minutes have not passed, the operation returns to the step S11. At the step S34, when it is judged that five minutes have passed, the timer 24 is reset (step S35) to let the speed down by one step if the speed of the compressor 3 is not "L" (step S36) to start the timer 24 (step S37), thereafter to return to the step S11.

At step S41, processing of F=b is implemented in connection with the flag F (step S41) to reset the timer 24 (step S42) to thereafter return to the step S11.

At step S51, judgement as to whether or not F=c holds is made in connection with the flag F. As a result, when F=c does not hold, processing of F=c (step S53) is implemented to start the timer 24 (step S53) to return to the step S11. In contrast, at the step S51, when it is judged that F=c holds, whether or not five minutes have elapsed since the start of the timer 24 is checked (step S54). As long as five minutes have not elapsed, the operation returns to the step S11. At step S54, when it is judged that five minutes have passed, the timer 24 is reset (step S55) to let the speed of the compressor 3 up by one step as long as it does not represent "H" (step S56) to start the timer 24 (step S57) thereafter to return to the step S11.

Figure 5:
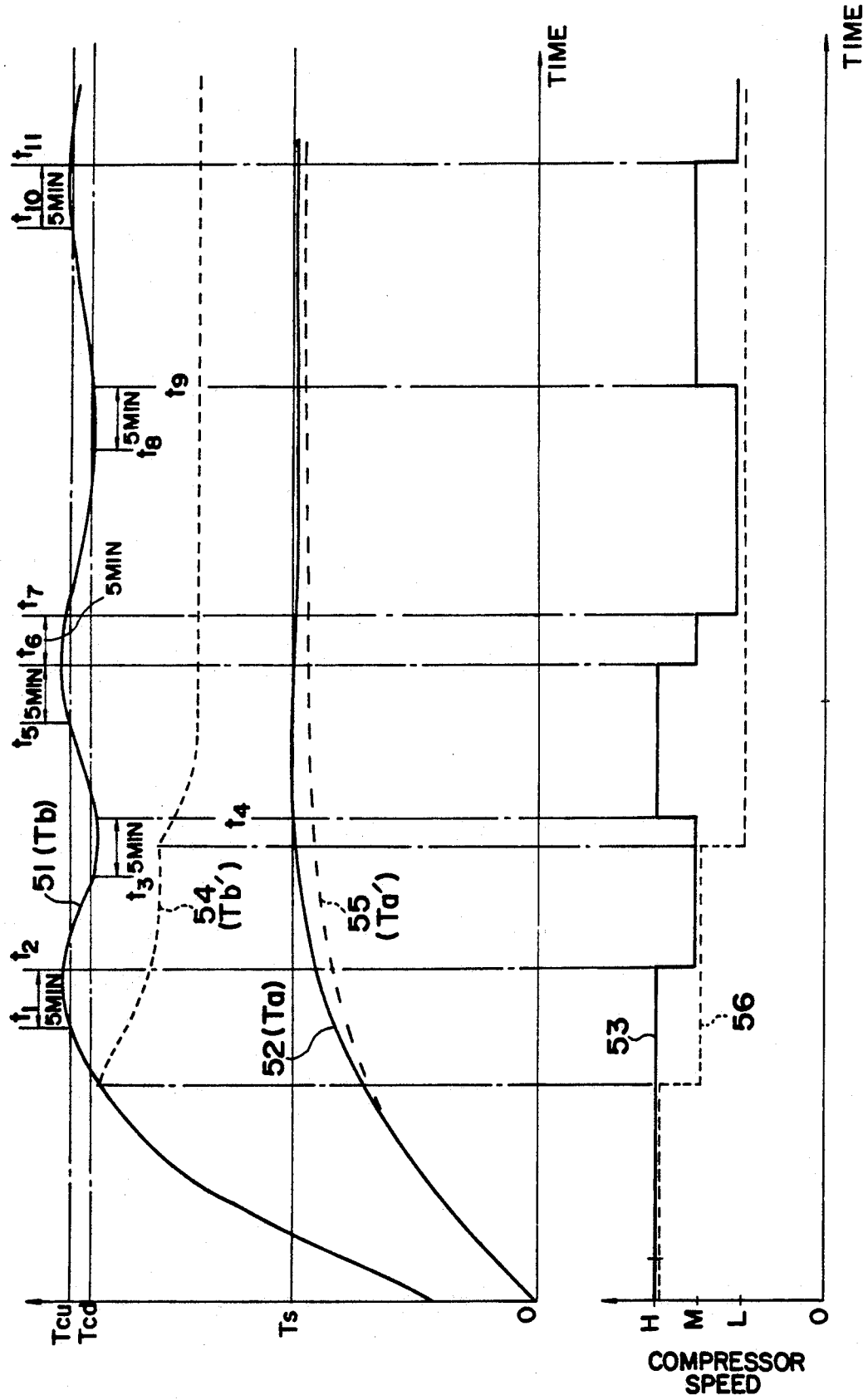
FIGS. 5 and 6 are timing charts showing the manner of controlling a heating apparatus in accordance with an embodiment of this invention and the manner of controlling a heating apparatus in accordance with the prior art.

FIG. 5 is a timing chart showing a control manner in accordance with an embodiment of this invention which has been described with reference to FIGS. 1 to 4 and a control manner in accordance with a prior art. The curve 51 represents a blowoff temperature Tb when the control in accordance with this invention is conducted, the curve 52 represents a room temperature Ta, and the line 53 represents a speed of the compressor 3.

FIG. 5 illustrates the behavior in the case where heating operation is initiated under the state where a room temperature Ta is greatly lower than a set value Ts. When the heating operation is started, since the temperature deviation $\Delta Ta$ is large in the beginning, the indoor fan 7 is operated under the state of the maximum airflow UH (step S14) and the compressor 3 is started at the same time (step S16). At times subsequent thereto, until one minute has passed, the compressor 3 is operated at the maximum speed H. When one minute has passed from the starting of the compressor, the compressor 3 continues being operated as long as the relationship $Ta > Ts$ (i.e., $\Delta Ta = Ts - Ta < 0$) is not satisfied. The speed of the operation follows the judged result at the step S20. Since the condenser temperature Tb is low in the beginning, it belongs to the zone C13 shown in FIG. 3. Thus, the operation in this case undergoes the step S51 and steps subsequent thereto. However, since the compressor 3 is already operated at the maximum speed H, step-up operation is not carried out. When the blowoff temperature Tb exceeds the set value Tcu at time $t_1$ to enter the zone C11, the timer 25 is started at the steps S32 and S33. At time $t_2$ when five minutes have passed, the speed of the compressor 3 is down by one step (step S36). As a result, the compressor 3 is operated at a medium speed M. Thus, the timer 25 is started for a second time (step S37). As a result of the fact that the speed of the compressor 3 is stepped down slightly to the medium speed M, the blowoff temperature Tb begins lowering. At the time when five minutes have elapsed from the time $t_2$, since the blowoff temperature Tb belongs to the zone C12, the timer 25 is only reset. Thus, the compressor 3 continues being operated at medium speed M. When the blowoff temperature Tb further lowers and falls below the set value Tcd at time $t_3$, the timer 25 is started (step S53). At time $t_4$ when five minutes have passed, the timer 25 is reset and the compressor speed is up by one step (step S56). As a result, the compressor 3 is operated at high speed H. Thus, the blowoff temperature Tb begins rising for a second time. When the blowoff temperature Tb exceeds the set value Tcu to enter the zone C11 at time $t_5$, the speed of the compressor 3 is stepped down to a medium speed M at time $t_6$ when five minutes have passed from that time (step S36). If the blowoff temperature Tb is still within the zone C11 at time $t_7$ when five minutes further have passed from the time $t_6$, the compressor speed is further stepped down to low speed L. Thus, the blowoff temperature Tb gradually lowers and is then below the set value Tcd at time $t_8$. When the blowoff temperature Tb enters the zone C13, the compressor speed is stepped up to the medium speed M at time $t_9$ when five minutes have passed from that time. When the blowoff temperature Tb exceeds the set value Tcu at time $t_{10}$, the compressor speed is stepped down to the low speed L at time $t_{11}$ when five minutes have passed from that time. By the above-described control of the blowoff temperature Tb by the compressor 3, the room temperature Ta (curve 52) gradually rises toward the set value Ts. When the relationship expressed as $Ta > Ts$ is established, the compressor 3 is turned OFF (step S13). When the relationship expressed as $Ta \leq Ts$ is established, the operation of the compressor 3 is started for a second time.

During the above-described control process, in accordance with the zone division shown in FIG. 2 dependent upon a temperature deviation $\Delta Ta = Ts - Ta$ in regard to the room temperature, when the temperature deviation $\Delta Ta$ is large, the indoor fan 7 is operated under the state of a relatively great airflow while when the temperature deviation $\Delta Ta$ is small, the indoor fan 7 is operated under the state of a relatively small airflow.

In FIG. 5 shows changes with time of a blowoff temperature Tb' (curve 54), a room temperature Ta' (curve 55), and an operating speed of the compressor (curve 56) respectively represented by broken lines 54, 55 and 56 in the case where heating control is carried out by the conventional system. In this case, the operating speed (line 56) of the compressor 3 is dependent upon the temperature deviation $\Delta Ta = Ts - Ta$. The compressor 3 is operated in dependency upon the value of the deviation Ta, namely, it is operated at a high speed H in the beginning, at an intermediate speed M for a short period thereafter, and at a low speed L when the temperature deviation $\Delta Ta$ becomes small. When the compressor speed is stepped down, the blowoff temperature Tb' (curve 54) lowers. During this time period, the indoor fan is operated under the state of a constant airflow. By the above-mentioned operation, the room temperature Ta' (curve 55) slightly gently rises.

When comparison between the blowoff temperature Tb indicated by the curve 51 and the temperature Tb' indicated by the curve 54 is made, it is apparent that the following advantages are provided. Namely, even in the case where the temperature deviation $\Delta Ta = Ts - Ta$ decreases and the heating load thus becomes small, the speed of the compressor 3 is permitted to be set to a relatively high value. Accordingly, the blowoff temperature Tb from the fan 7 is relatively high and the airflow from the indoor fan 7 is reduced, resulting in no possibility that uncomfortableness due to chilliness is given to human being in a room.

Figure 6:
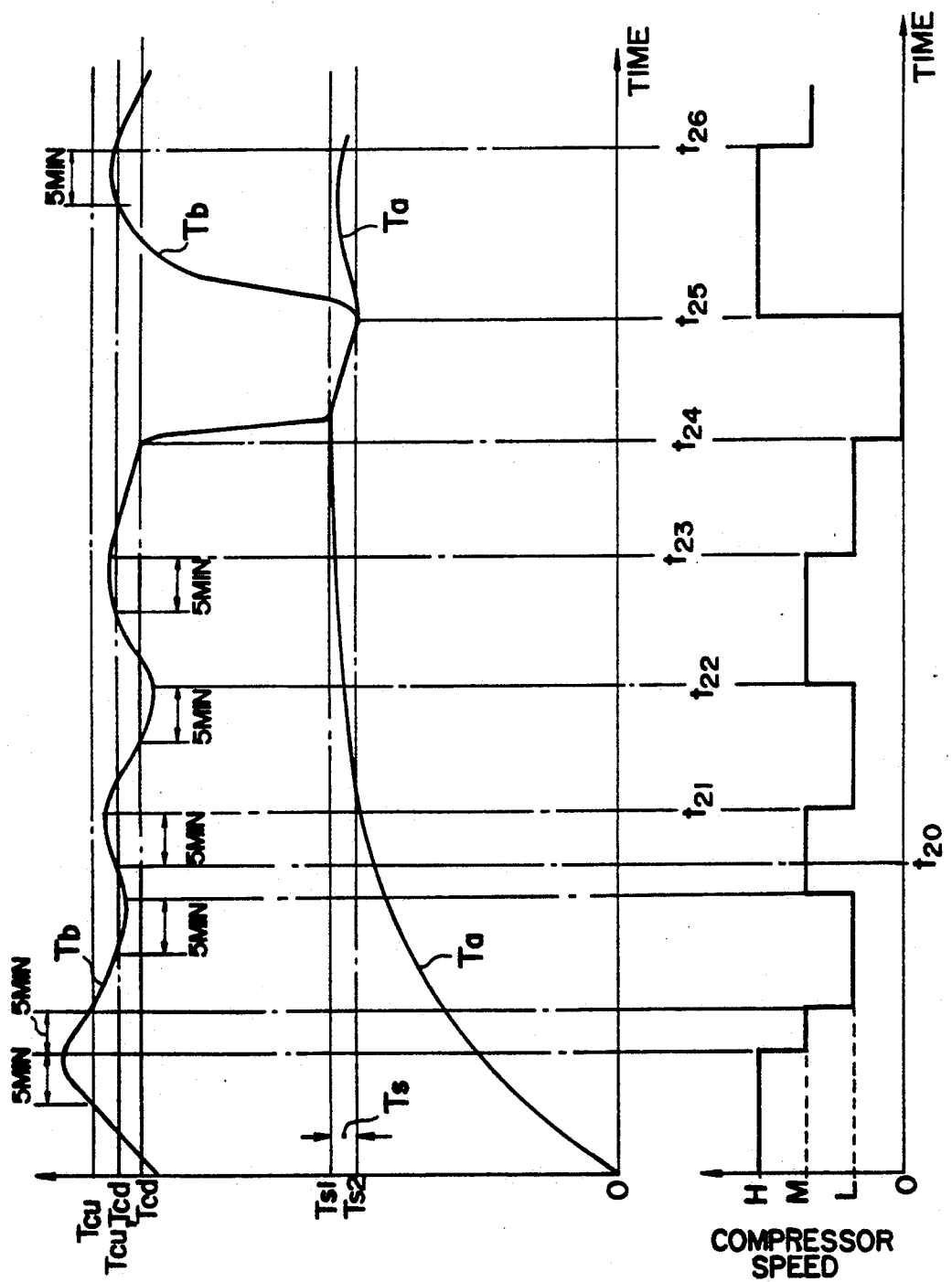

At the time when the temperature deviation $\Delta Ta = Ts - Ta$ becomes smaller than a predetermined value due to elevation of the room temperature Ta by the heating operation, new set values Tcu' and Tcd' obtained by shifting down set values with respect to the blowoff temperature Tb may be set, respectively, to thereby save a dissipated energy of the heating apparatus without damaging the heating effect to much extent. FIG. 6 shows the control manner where such an operation is conducted. In FIG. 6, there are shown a set value Ts1 in a rising process and a set value Ts2 in a falling process in regard to the room temperature set value Ts. The difference $\Delta Ts = Ts1 - Ts2$ between both set values is a hysteresis width for rendering a hysteresis characteristic. In the case of FIG. 6, until the temperature deviation $\Delta Ta$ is less than a predetermined value, control of the compressor speed is carried out in accordance with the same principle as indicated in FIG. 5, on the basis of the set values Tcu and Tcd in regard to the blowoff temperature. At the time point $t_{20}$ when the temperature deviation $\Delta Ta$ is below a predetermined value, set values Tcu and Tcd are shifted down to new set values Tcu' and Tcd' in regard to the blowoff temperature, respectively. The following control will be conducted in accordance with the flowcharts shown in FIGS. 4A and 4B. Since the blowoff temperature Tb is above the set value Tcu' at the time point $t_{20}$ when shift down of the blowoff temperature set value has been conducted, the compressor speed is stepped down to the low speed L at the time $t_{21}$ when five minutes have passed from that time. As a result of the fact that the relationship Tb≦Tcd' is established, the compressor speed is stepped up to the medium speed M at the time $t_{22}$ when five minutes has elapsed since that time. Thereafter, as a result of the fact that the relationship Tb>Tcu' is established, the compressor speed is stepped down to the low speed L for a second time at time $t_{23}$ when five minutes have passed from that time. When the relationship Ta>Ts (i.e., ΔTa=Ts−Ta<0) is established at time $t_{24}$, the operation of the compressor 3 is turned off. Thus, the blowoff temperature Tb rapidly lowers to a value smaller than the set value Tcd', and the room temperature gradually lowers. When the relationship Ta≦Ts2 is established at time $t_{25}$, the compressor 3 is started for a second time, and is thus operated at a high speed H. When the blowoff temperature Tb rises to reach a value such that the relationship Tb≧Tcu' is established, the compressor speed is stepped down to the lower speed L at time $t_{26}$ when five minutes have passed from that time.

By conducting a control as stated above, as understood from the comparison with the compressor speed shown in FIG. 5, the compressor is operated at a lower speed on the average without lowering a room temperature Ta too many degrees. Dissipated energy can, therefore, be saved.

We claim:

1. A heat pump heating apparatus comprising:
   a refrigerating cycle constructed to include a compressor, a condenser, and an evaporator;
   an indoor fan for blowing off into a room air heat exchanged by said condenser;
   first drive means for adjustably driving said compressor;
   second drive means for adjustably driving said indoor fan;
   first sensor means for sensing a room temperature,
   second sensor means for sensing a temperature of air blown off from said indoor fan;
   first setting means for setting a room temperature;
   second setting means for setting a temperature of air blown off from said indoor fan;
   first control means wherein, when a room temperature sensed by said first sensor means, is less than a temperature set by said first setting means, said first control means is operative to control a speed of said compressor through said first drive means so that a deviation between a temperature sensed by said second sensor means and a temperature set by said second setting means is reduced; and
   second control means for controlling a speed of said indoor fan through said second drive means so as to take a speed value within a speed range corresponding to a deviation between a room temperature sensed by said first sensor means and the temperature set by said first setting means.

2. A heating apparatus as set forth in claim 1, wherein said first drive means comprises a first a.c. motor for driving said compressor, and an inverter for delivering a controlled power to said first a.c. motor.

3. A heating apparatus as set forth in claim 1, wherein said second drive means is comprised of a second a.c. motor for driving said indoor fan, and a fan motor drive circuit for delivering a controlled power to said second a.c. motor.

4. A heating apparatus as set forth in claim 1, wherein said second control means sets, as a set speed of said indoor fan, any one of plural steps determined in advance in dependency upon a deviation between a room temperature sensed by said sensor means and a temperature set by said first setting means.

5. A heating apparatus as set forth in claim 4, wherein said set speed of said indoor fan comprises five steps, a maximum speed, a high speed, a medium speed, a low speed, and a minimum speed.

6. A heating apparatus as set forth in claim 1, wherein said first control means has an ability to set speeds of a plurality of steps with respect to said compressor, and is operative to let a set speed of said compressor up or down by one step every a predetermined time so that a blowoff temperature sensed by said second sensor means becomes close to said set temperature within said steps when said blowoff temperature is away from said temperature set by said second setting means irrespective of the operation of said compressor.

7. A heating apparatus as set forth in claim 6, wherein said plural steps are three steps of a high speed, a medium speed, and a low speed.

8. A heating apparatus as set forth in claim 1, wherein said second sensor means is comprised of a condenser temperature sensor attached on said condenser, and means for correcting the output of said condenser temperature sensor depending upon an airflow from said indoor fan to obtain said blowoff temperature.

* * * * *